United States Patent
Bordin et al.

(10) Patent No.: US 8,558,477 B2
(45) Date of Patent: Oct. 15, 2013

(54) METHOD AND DEVICE FOR OBTAINING CONDUCTION ANGLE, METHOD AND DEVICE FOR DRIVING LED

(75) Inventors: Luca Bordin, Shenzen (CN); Yuli Chen, Shenzen (CN); Shijun Nie, Shenzen (CN); Wei Tan, Shenzen (CN)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 263 days.

(21) Appl. No.: 13/097,143

(22) Filed: Apr. 29, 2011

(65) Prior Publication Data

US 2011/0266968 A1 Nov. 3, 2011

Related U.S. Application Data

(60) Provisional application No. 61/358,459, filed on Jun. 25, 2010.

(30) Foreign Application Priority Data

Apr. 30, 2010 (CN) .......................... 2010 1 0168705

(51) Int. Cl.
*H05B 41/16* (2006.01)

(52) U.S. Cl.
USPC ........................ 315/287; 315/209 R; 315/291

(58) Field of Classification Search
USPC ............ 315/209 R, 210–211, 287, 225–226, 315/291, 307, 308
See application file for complete search history.

(56) References Cited

U.S. PATENT DOCUMENTS

| 7,242,150 | B2 * | 7/2007 | DeJonge et al. ............... 315/225 |
| 7,667,408 | B2 * | 2/2010 | Melanson et al. ............ 315/224 |
| 8,222,832 | B2 * | 7/2012 | Zheng et al. .................. 315/291 |
| 2003/0127994 | A1 | 7/2003 | Patchornik et al. |
| 2009/0160369 | A1 | 6/2009 | Godbole et al. |

FOREIGN PATENT DOCUMENTS

WO 2006018830 A2 2/2006

* cited by examiner

*Primary Examiner* — James H Cho (57) ABSTRACT

In various embodiments, a method for obtaining a conduction angle of a trailing edge dimmer is provided. The method may include determining a time point t0 when the trailing edge dimmer starts to be conductive; determining an earliest time point t1 when a deviation from an ideal waveform appears; and determining the conduction angle t1-t0 of the trailing edge dimmer based on the earliest time point t1 when the deviation from the ideal waveform appears and the time point t0 when the trailing edge dimmer starts to be conductive.

12 Claims, 7 Drawing Sheets

METHOD AND DEVICE FOR OBTAINING CONDUCTION ANGLE, METHOD AND DEVICE FOR DRIVING LED

CROSS-REFERENCE TO RELATED APPLICATION

This application claims priority to Chinese Patent Application Serial No. 201010168705.6, which was filed Apr. 30, 2010, and is incorporated herein by reference in its entirety. Furthermore, this application claims the benefit of U.S. Provisional Patent Application Ser. No. 61/358,459, which was filed Jun. 25, 2010, and is incorporated herein by reference in its entirety.

TECHNICAL FIELD

Various embodiments relate to a method and a device for obtaining a conduction angle of a trailing edge dimmer. Further, various embodiments relate to a method and a device for driving a light emitting diode (LED).

BACKGROUND

Figure 1:
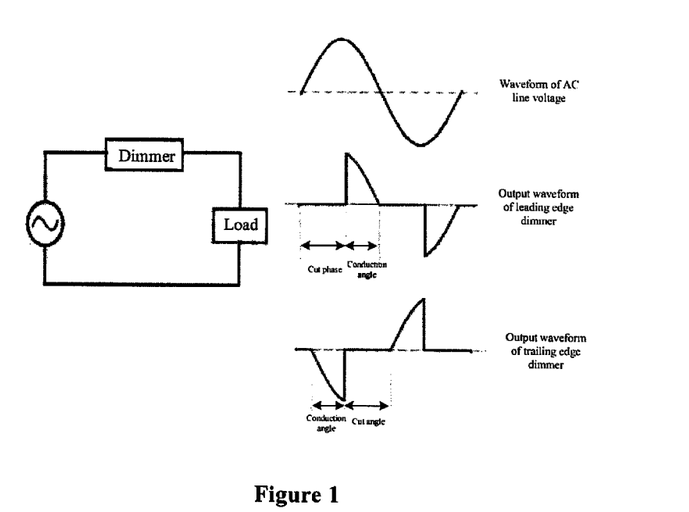
FIG. 1 shows a common connection method of the dimmer in the prior art and an ideal output waveform of the dimmer.

Presently, dimmers widely used in the market are designed for a pure resistance load such as an incandescent lamp. These dimmers adjust the effective value of the input voltage through phase control, so as to achieve the brightness adjustment for the lamp. The phase control dimmer mainly includes a leading edge dimmer and a trailing edge dimmer FIG. 1 shows respectively a common connection method of the dimmer in the prior art and an ideal output waveform of the dimmer.

With respect to an LED device, it cannot be connected to a mains supply network directly as an incandescent lamp, and thus the traditional dimmer cannot be directly used for dimming. Instead, a switching power supply needs to be used as a DC driving device for the LED device. Thus, it is desired that such LED driving device can be compatible with the traditional dimmer. However, there is no satisfying device provided in the prior art that can be compatible with the traditional dimmer, and especially no satisfying device is provided that can be compatible with the trailing edge dimmer.

SUMMARY

In various embodiments, a method for obtaining a conduction angle of a trailing edge dimmer is provided. The method may include determining a time point t0 when the trailing edge dimmer starts to be conductive; determining an earliest time point t1 when a deviation from an ideal waveform appears; and determining the conduction angle t1-t0 of the trailing edge dimmer based on the earliest time point t1 when the deviation from the ideal waveform appears and the time point t0 when the trailing edge dimmer starts to be conductive.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. In the drawings, the same reference signs are used for the same or corresponding components.

The word "exemplary" is used herein to mean "serving as an example, instance, or illustration". Any embodiment or design described herein as "exemplary" is not necessarily to be construed as preferred or advantageous over other embodiments or designs.

Various embodiments provide a method and a device for obtaining a conduction angle of a trailing edge dimmer. Various embodiments provide a method and a device for driving an LED that can be compatible with the leading edge dimmer and the trailing edge dimmer simultaneously.

According to an embodiment, there is provided a method for obtaining a conduction angle of a trailing edge dimmer, including: determining a time point t0 when the trailing edge dimmer starts to be conductive; determining an earliest time point t1 when a deviation from an ideal waveform appears; and determining the conduction angle t1-t0 of the trailing edge dimmer based on the earliest time point t1 when the deviation from the ideal waveform appears and the time point t0 when the trailing edge dimmer starts to be conductive.

With this method, the conduction angle of the trailing edge dimmer may be effectively determined, so that LED can be dimmed according to the conduction angle of the trailing edge dimmer, and an influence of the random interference can be reduced.

Further, according to an embodiment, there is provided an LED driving method, which may include: determining a type of a dimmer; obtaining a conduction angle of a leading edge dimmer, when it is determined that the dimmer connected is the leading edge dimmer; obtaining a conduction angle of a trailing edge dimmer with above method, when it is determined that the dimmer connected is the trailing edge dimmer; and generating a dimming signal according to the obtained conduction angle of the dimmer.

With this method, compatibility with the leading edge dimmer and the trailing edge dimmer can be effectively achieved, and the LED can be dimmed according to the conduction angle of the phase dimmer. Moreover, the influence of the random interference can be reduced, and the flickering of the LED caused by the jittering of the dimmer can be eliminated.

Further, according to an embodiment, there is provided a conduction angle obtaining device for a trailing edge dimmer, comprising: a conducting time point determiner, which is configured to determine a time point t0 when the trailing edge dimmer starts to be conductive; a phase cutting point determiner, which is configured to determine an earliest time point t1 when a deviation from an ideal waveform appears; and a conduction angle determiner, which is configured to determine the conduction angle t1-t0 of the trailing edge dimmer based on the earliest time point t1 when the deviation from the ideal waveform appears and the time point t0 when the trailing edge dimmer starts to be conductive.

With this device, the conduction angle of the trailing edge dimmer can be effectively determined, so as to perform dimming on the LED according to the conduction angle of the trailing edge dimmer. Further, the influence of the random interference can be reduced.

Further, according to an embodiment of the invention, there is provided an LED driving device, which may include: a dimmer type determiner, which is configured to determine a type of a dimmer; a conduction angle obtaining device for a leading edge dimmer, which is configured to obtain a conduction angle of a leading edge dimmer, when it is determined that the dimmer connected is the leading edge dimmer; a conduction angle obtaining device for a trailing edge dimmer as described above, which is configured to obtain a conduction angle of a trailing edge dimmer, when it is determined that the dimmer connected is the trailing edge dimmer; and a dimming unit, which is configured to generate a dimming signal according to the obtained conduction angle of the dimmer.

With the LED driving device, compatibility with the leading edge dimmer and the trailing edge dimmer can be effectively achieved, and the LED can be dimmed according to the conduction angle of the phase dimmer. Moreover, the influence of the random interference can be reduced, and the flickering of the LED caused by the jittering of the dimmer can be eliminated.

Further, according to an embodiment of the invention, there is provided an LED driving method, which may include: generating a PWM control signal with a PWM dimming signal; and controlling a PWM DC/DC converter with the PWM control signal, so as to generate a driving voltage of the LED.

With this method, the PWM dimming can be utilized, and meanwhile an effective isolation between the LED device and the high voltage power supply can be ensured.

Further, according to an embodiment, there is provided an LED driving system, which may include: a PWM DC/DC converter, a PWM controller and a PWM dimming signal generator; wherein: the PWM dimming signal generator is configured to generate a PWM dimming signal; the PWM controller is configured to generate a PWM control signal by utilizing the PWM dimming signal; and the PWM DC/DC converter is configured to generate a driving voltage of LED according to the PWM control signal.

With this LED driving system, the PWM dimming can be utilized, and meanwhile an effective isolation between the LED device and the high voltage power supply can be ensured, so that it is guaranteed that the system can easily be designed in conformity with the security standard. Moreover, the system has a simple structure, so that the production cost is greatly reduced, and a precise constant current character can be ensured. Thus, the high precision requirements regarding the current of LED can be met.

Hereinafter, various embodiments will be described in combination with the drawings. In view of clearness and conciseness, not all the features of the practical embodiments are described in the description. However, it should be understood that many decisions specific to the embodiments need to be made during the development of any practical embodiments, so as to achieve the specific objects of the developer, and these decisions may vary to some extent according to different embodiments. Further, it should be understood that although the developing work may be rather complicated and time-consuming, it is only a routine job for those skilled in the art who benefit from the disclosure of the various embodiments.

It should be further pointed out here that in the drawings, only the device structure closely related to the solution of the various embodiments is illustrated in the drawings, and other details having little relation with the various embodiments is omitted, so as to avoid making the various embodiments unclear due to unnecessary details.

First Embodiment

Figure 2:
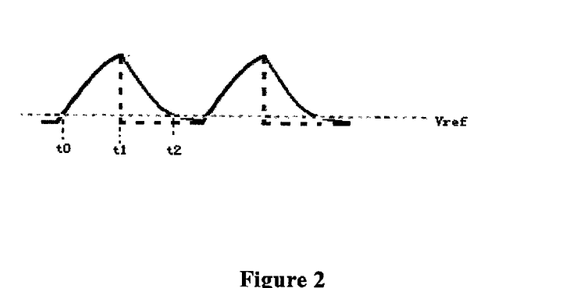
FIG. 2 shows an example waveform of a rectified output voltage of the trailing edge dimmer.

The inventor notices that for a trailing edge dimmer, a capacitor whose typical value is 100 nF-150 nF is generally connected with the output terminal of the trailing edge dimmer in parallel. Moreover, the Electro-Magnetic Interference (EMI) filter on the input terminal of the LED driver generally also includes a capacitor. These capacitors may cause that the output voltage of the dimmer cannot decrease rapidly as in the ideal waveform. FIG. 2 shows an example waveform of a rectified output voltage of the trailing edge dimmer. As shown in FIG. 2, before starting of another cycle, the voltage is decreased to zero after a relatively long time period. In such situation, the time point t2 when the output voltage of the dimmer is decreased to zero cannot reflect the conduction angle of the dimmer correctly, which may cause that the LED lamp cannot be dimmed correctly or that the dimmable range is fairly narrow. This is the reason why there is no dimmable LED lamp available on the market that can practically be compatible with the trailing edge dimmer.

The inventor notices that, as shown in FIG. 2, after the phase cutting of the trailing edge dimmer, although the voltage cannot be decreased to zero quickly, a certain difference exists between the waveform thereof and the ideal waveform. Therefore, if the earliest time point t1 when a deviation from the ideal waveform appears can be determined, it can be deemed that the trailing edge dimmer performs the phase cutting at this time point. Thus, it can be determined that the conduction angle of the trailing edge dimmer is t1-t0, wherein t0 is the time point when the trailing edge dimmer starts to be conductive.

Figure 3:
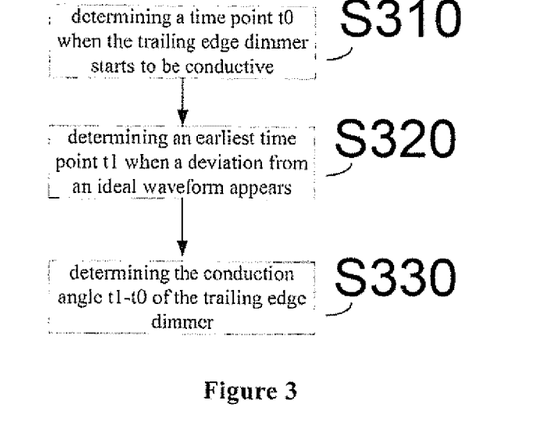
FIG. 3 shows a flow chart of the method for obtaining the conduction angle of the trailing edge dimmer according to an embodiment.

Based on the above consideration, according to an embodiment of the invention, there is provided a method for obtaining a conduction angle of the trailing edge dimmer FIG. 3 shows the flow chart of this method. As shown in FIG. 3, the method may include the following:

S310: determining a time point t0 when the trailing edge dimmer starts to be conductive. After the time point t0, the trailing edge dimmer starts to be conductive, thus the output voltage thereof should be substantially the same as the ideal waveform. The ideal waveform is assumed to be a sinus wave in FIG. 2. Thus, in the conductive phase of the trailing edge dimmer starting from the time point t0, the output voltage is substantially the same as the sinus wave.

S320: determining an earliest time point t1 when a deviation from an ideal waveform appears. Specifically, in step S320, a sampling can be performed on the output voltage of the trailing edge dimmer, the sampled values are compared with the ideal waveform, and the earliest time point t1 when the deviation from the ideal waveform appears is determined based on the difference between the output voltage and the ideal waveform. When the time point t1 is determined, the time point t1 is considered to be the phase cutting point of the trailing edge dimmer.

S330: determining the conduction angle t1-t0 of the trailing edge dimmer based on the earliest time point t1 when the deviation from the ideal waveform appears and the time point t0 when the trailing edge dimmer starts to be conductive.

When the conduction angle of the trailing edge dimmer is obtained, the LED can be dimmed according to the determined conduction angle. For example, a PWM (Pulse Width Modulation) signal can be generated according to the conduction angle of the dimmer, wherein the duty cycle of the PWM signal is relevant to the conduction angle of the dimmer, and the PWM signal is used for the regulation of the LED brightness. Certainly it is also possible that a linear dimming is performed according to the conduction angle of the dimmer, which can be easily conceived by those skilled in the art.

Since the LED driving device is not a resistance load, there may exist a situation that the matching between the LED driving device and the dimmer is not particularly ideal. In this situation the output of the LED driving device may has a random interference, so that a flickering of the LED lamp may be easily caused. For this situation, it may be provided to calculate an average value of the conduction angles obtained in a plurality of cycles during the detecting process of the conduction angle of the dimmer and perform dimming on the LED according to the average value, so as to reduce the influence of the random interference.

With the method for obtaining the conduction angle of the trailing edge dimmer according to various embodiments, the conduction angle of the trailing edge dimmer can be effectively determined, so as to perform dimming on the LED according to the conduction angle of the trailing edge dimmer. Further, the influence of the random interference can be reduced.

Second Embodiment

The traditional dimmer includes the leading edge dimmer and the trailing edge dimmer. Therefore, according to various embodiments, there is provided a method for driving an LED that can be compatible with the leading edge dimmer and the trailing edge dimmer.

Figure 4:
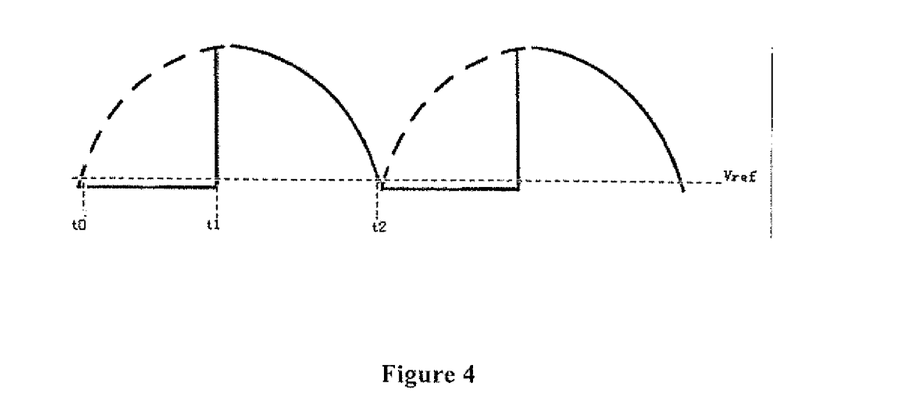
FIG. 4 shows an example waveform of a rectified output voltage of the leading edge dimmer.

Before illustrating the method for driving the LED in detail, a method for obtaining the conduction angle of the leading edge dimmer is firstly described. FIG. 4 shows an example waveform of a rectified output voltage of the leading edge dimmer. As can be seen from the drawing, in the period between the time point t0 and the time point t1, the output voltage of the leading edge dimmer is substantially zero. At time point t1, the leading edge dimmer becomes conductive, so that a jump appears in the output voltage. Until the time point t2, the output voltage decreases to zero according to the standard voltage. Thus, it is only required to detect the voltage zero cross at the time points t1 and t2, so as to detect the conduction angle of the leading edge dimmer. This method for obtaining the conduction angle of the leading edge dimmer is familiar to those skilled in the art and will not be illustrated in detail here.

Figure 5:
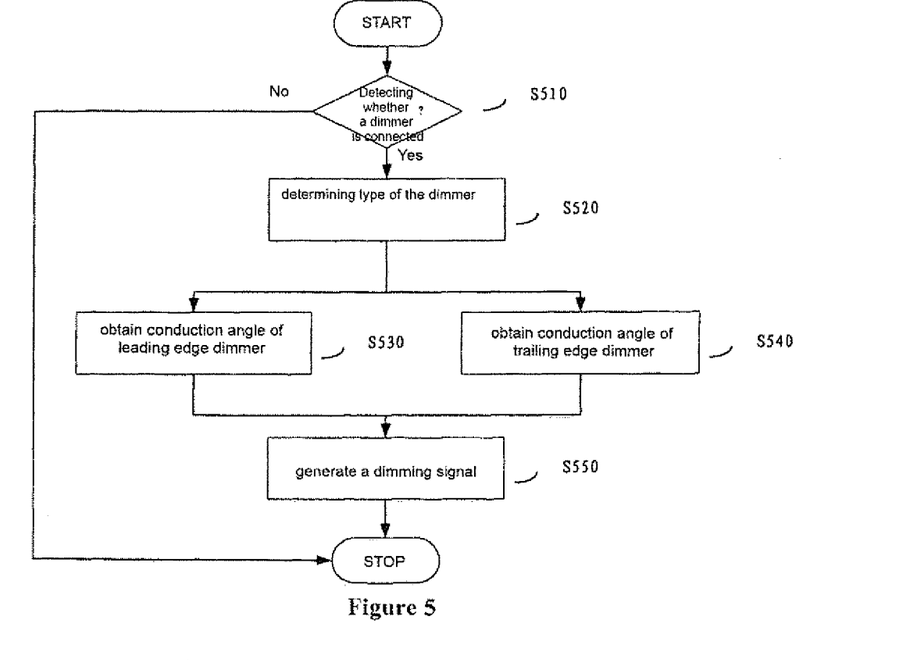
FIG. 5 shows a flow chart of the method for driving LED that can be compatible with the leading edge dimmer and the trailing edge dimmer.
Figure 6:
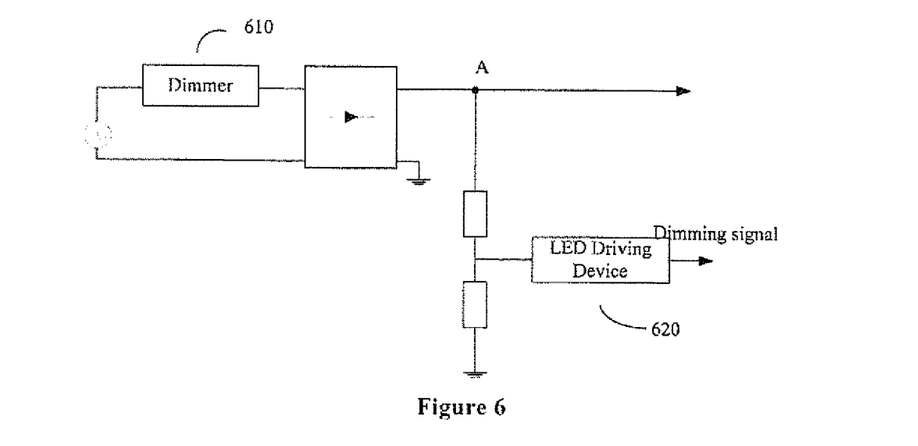
FIG. 6 shows a principle diagram for dimmer detection.

FIG. 5 shows a flow chart of the method for driving LED that can be compatible with the leading edge dimmer and the trailing edge dimmer. As shown in FIG. 5, the method may include the following:

S510: detecting whether a dimmer is connected. FIG. 6 can be referred to, where a principle diagram for dimmer detection is schematically illustrated. In the operation, an LED driving device 620 performs sampling and analysis for the voltage on point A at a certain sampling rate through a resistance voltage divider. In S510, the LED driving device 620 compares the sampled voltage with a reference voltage. The reference voltage may be already stored in the LED driving device 620, or may be input from external. The LED driving device 620 can analyze the time when the sampled voltage is larger than and smaller than the reference voltage, and take such time information as a criterion to determine whether a dimmer is connected. It can be readily conceived by those skilled in the art that the LED driving device can be implemented with a micro-controller such as MCU or DSP.

It should be noted that in the method according to various embodiments, S510 is optional. For example, according to a configuration, it can be deemed by default that a dimmer is connected, so that the subsequent steps are implemented directly.

S520: determining a type of the dimmer when it is determined that the dimmer is connected. It can be seen from FIG. 1 that the output waveform of the leading edge dimmer is obviously different from that of the trailing edge dimmer. Thus, the type of the dimmer can be determined according to the sampled signals.

When it is determined that the connected dimmer is a leading edge dimmer, the conduction angle of the leading edge dimmer is obtained with the method for obtaining the conduction angle of the leading edge dimmer as described above.

When it is determined that the connected dimmer is a trailing edge dimmer, the conduction angle of the trailing edge dimmer is obtained with the method for obtaining the conduction angle of the trailing edge dimmer as described in the first embodiment.

Subsequently, in step S550, a dimming signal is generated according to the obtained conduction angle.

Similar to the first embodiment, it may be provided to calculate an average value of the conduction angles obtained in a plurality of cycles during the detecting process of the conduction angle of the dimmer and perform dimming on the LED according to the average value, so as to reduce the influence of the random interference.

In the operation of the dimmer, a jittering may occur due to the jittering in the input signal and so on, and a corresponding small change may be caused in the conduction angle of the dimmer. However, it is actually not desired at this time to change the dimming of the LED. Thus, it is preferred that in the method according to various embodiments, an anti-jittering control process is comprised after the conduction angle of the dimmer is obtained. In the anti jittering control step, the change in the conduction angle of the dimmer is detected, and only when the change in the conduction angle of the dimmer is larger than a certain threshold value, the dimming signal is generated in the dimming step according to the changed conduction angle of the dimmer. Thus, the flickering of the LED caused by the jittering of the dimmer can be eliminated.

With the method for driving LED according to the present embodiment, compatibility with the leading edge dimmer and the trailing edge dimmer can be effectively achieved, and the LED can be dimmed according to the conduction angle of the phase dimmer. Moreover, the influence of the random interference can be reduced, and the flickering of the LED caused by the jittering of the dimmer can be eliminated.

Third Embodiment

Figure 7:
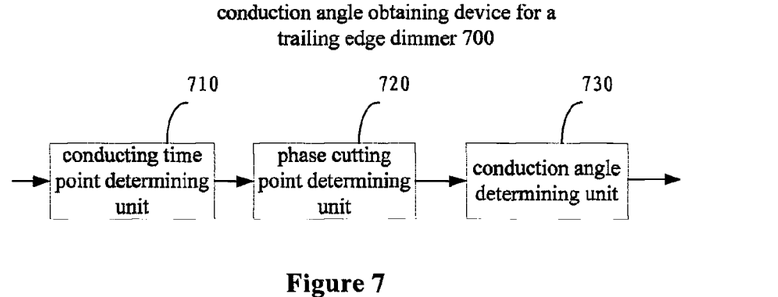
FIG. 7 shows a schematic block diagram of a conduction angle obtaining device for the trailing edge dimmer according to an embodiment.

The third embodiment corresponds to the above first embodiment, where a conduction angle obtaining device for the trailing edge dimmer 700 is described. FIG. 7 shows a schematic block diagram of the conduction angle obtaining device for the trailing edge dimmer 700 according to the third embodiment. As shown in FIG. 7, the conduction angle obtaining device for the trailing edge dimmer 700 may include:

A conducting time point determiner 710, which is configured to determine a time point t0 when the trailing edge dimmer starts to be conductive. After the time point t0, the trailing edge dimmer starts to be conductive, thus the output voltage thereof should be substantially the same as the ideal waveform. The ideal waveform is assumed to be a sinus wave in FIG. 2. Thus, in the conductive phase of the trailing edge dimmer starting from the time point t0, the output voltage is substantially the same as the sinus wave.

A phase cutting point determiner 720, which is configured to determine an earliest time point t1 when a deviation from an ideal waveform appears. Specifically, the phase cutting point determiner 720 may further include a sampling device and a comparing device, wherein the sampling device is configured to perform a sampling on the output voltage of the trailing edge dimmer to obtain sampled values, and the comparing device is configured to compare the sampled values with the ideal waveform, and determine the earliest time point t1 when the deviation from the ideal waveform appears based on the difference between the output voltage and the ideal waveform. When the time point t1 is determined, the time point t1 is considered to be the phase cutting point of the trailing edge dimmer.

A conduction angle determiner 730, which is configured to determine the conduction angle t1-t0 of the trailing edge dimmer based on the earliest time point t1 when the deviation from the ideal waveform appears and the time point t0 when the trailing edge dimmer starts to be conductive.

Since the LED driving device is not a resistance load, there may exist a situation that the matching between the LED driving device and the dimmer is not particularly ideal. In this situation the output of the LED driving device may have a random interference, so that a flickering of the LED lamp may be easily caused. For this situation, it may be provided that the conduction angle determiner 730 may further include an averaging device, which is configured to calculate an average value of the conduction angles obtained in a plurality of cycles during the detecting process of the conduction angle of the dimmer, and take the average value as the finally obtained conduction angle, so as to reduce the influence of the random interference.

With the conduction angle obtaining device for the trailing edge dimmer 700 according to the present embodiment, the conduction angle of the trailing edge dimmer can be effectively determined, so as to perform dimming on the LED according to the conduction angle of the trailing edge dimmer. Further, the influence of the random interference can be reduced.

Fourth Embodiment

The fourth embodiment corresponds to the above second embodiment, where an LED driving device 800 that is compatible with the leading edge dimmer and the trailing edge dimmer is described.

Figure 8:
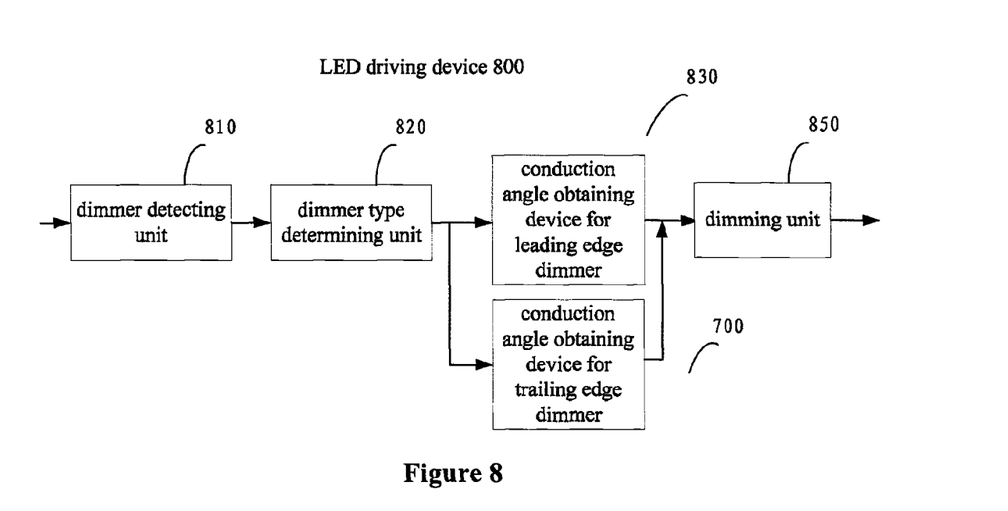
FIG. 8 shows a block diagram of an LED driving device that can be compatible with the leading edge dimmer and the trailing edge dimmer according to an embodiment.

FIG. 8 shows a block diagram of an LED driving device that can be compatible with the leading edge dimmer and the trailing edge dimmer according to the embodiment. As shown in FIG. 8, the LED driving device 800 may include the following modules:

A dimmer detector 810, which is configured to detect whether a dimmer is connected. FIG. 6 can be referred to, where a principle diagram for dimmer detection is schematically illustrated. Please refer to the description in the second embodiment for the detailed procedure for dimmer detection, which will not be described again here. As described in the second embodiment, the dimmer detector 810 is optional in the LED driving device 800.

A dimmer type determiner 820, which is configured to determine a type of the dimmer when it is determined that the dimmer is connected. It can be seen from FIG. 1 that the output waveform of the leading edge dimmer is obviously different from that of the trailing edge dimmer. Thus, the dimmer type determiner 820 can determine the type of the dimmer according to the sampled signals.

A conduction angle obtaining device for the leading edge dimmer 830, which is configured to obtain the conduction angle of the leading edge dimmer with the method for detecting the conduction angle of the leading edge dimmer, when it is determined that the connected dimmer is a leading edge dimmer.

A conduction angle obtaining device for the trailing edge dimmer 700 as described in the third embodiment, which is configured to obtain the conduction angle of the trailing edge dimmer when it is determined that the connected dimmer is a trailing edge dimmer.

A dimming circuit 850, which is configured to generate a dimming signal according to the obtained conduction angle.

In various embodiments, the conduction angle obtaining device for the leading edge dimmer 830 and the conduction angle obtaining device for the trailing edge dimmer 700 are configured to calculate an average value of the conduction angles obtained in a plurality of cycles, so that the dimming unit 850 can perform dimming on the LED according to the average value, so as to reduce the influence of the random interference.

Further, in various embodiments, the LED driving device 800 may include an anti jittering control unit (not shown), which is configured to detect the change in the conduction angle of the dimmer, and only when the change in the conduction angle of the dimmer is larger than a certain threshold value, the dimming signal is generated according to the changed conduction angle of the dimmer. Thus, the flickering of the LED caused by the jittering of the dimmer may be eliminated.

With the LED driving device 800 according to the present embodiment, compatibility with the leading edge dimmer and the trailing edge dimmer can be effectively achieved, and the LED can be dimmed according to the conduction angle of the phase dimmer. Moreover, the influence of the random interference can be reduced, and the flickering of the LED caused by the jittering of the dimmer can be eliminated.

Fifth Embodiment

Figure 9:
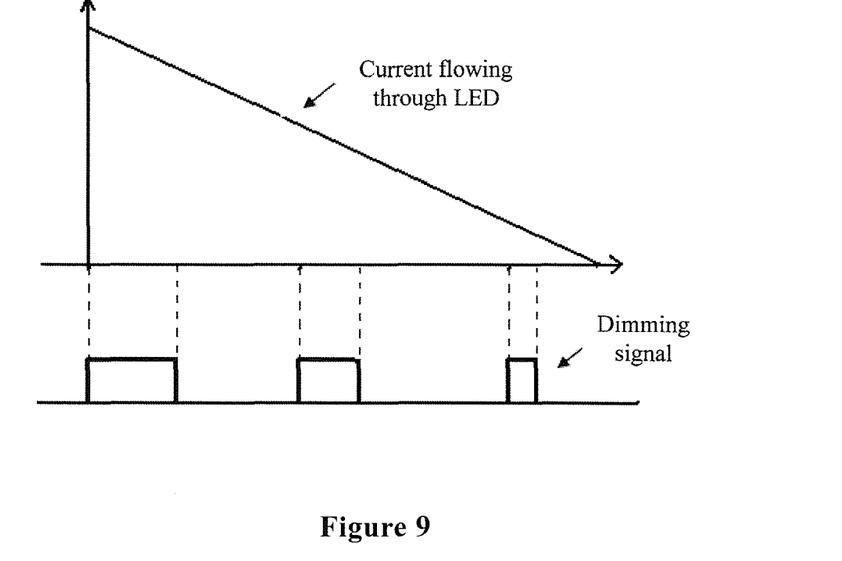
FIG. 9 schematically shows the principle of the linear dimming.
Figure 10:
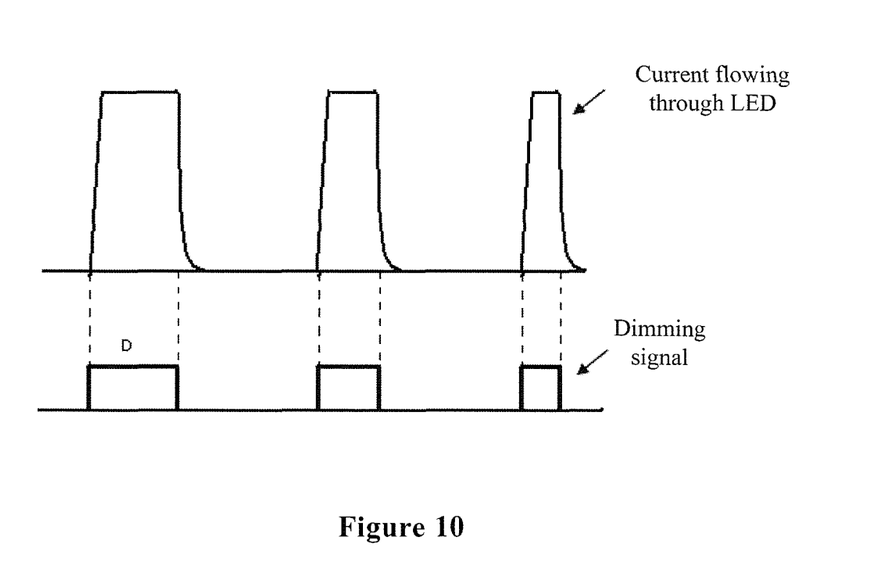
FIG. 10 schematically shows the principle of the PWM dimming.

The inventor notices that a high voltage mains supply within a range of 100V to 230V is usually employed as the input power supply of the LED device. In order to fulfill the security requirements, it is desirable to isolate the LED device from such high voltage power supply, so as to avoid a potential damage to the person. On the other hand, it is known to those skilled in the art that there are two methods for dimming the LED, i.e., the linear dimming and the PWM dimming FIG. 9 schematically shows the principle of the linear dimming. As can be seen from FIG. 9, the magnitude of the current flowing through the LED varies according to the dimming signal. Since the LED can achieve the highest light-emitting efficiency and obtain the color temperature of the nominal value (key parameters of the LED) only in the case of the rated operation current, the linear dimming lowers the light-emitting efficiency of the LED and changes the color temperature of LED with the change of the driving current. FIG. 10 schematically shows the principle of the PWM dimming. As can be seen from FIG. 10, during the conduction of LED, the magnitude of the current flowing through LED maintains unchanged, and thus a relatively high light-emitting efficiency and a good light-emitting quality can be achieved.

As can be seen from the above analysis, for an LED driving system, it is desirable to employ the PWM dimming, and ensure at the same time an effective isolation between the LED device and the high voltage power supply. However, no satisfying solution is available at present.

Because a DC voltage is provided to drive the LED, it is known to those skilled in the art the isolate the LED device from the high voltage power supply with a DC/DC converter. In order to use the DC/DC converter, it is provided that a PWM control signal is output by the PWM controller to control the switching of the DC/DC converter, so that the voltage from the power supply becomes a high frequency pulse, and thus can be converted by the converter into a low voltage for driving the LED. Generally, the frequency of the PWM control signal is in the order often kilohertz (kHz) to hundred kilohertz.

The inventor notices that the frequency of the PWM dimming signal that is used to perform PWM dimming for the LED is generally in the range from 100 Hz to 1000 Hz, which is much lower than that of the PWM control signal. When the PWM dimming signal is modulated to the present PWM control signal directly, i.e., when an amplitude modulation is performed on the present PWM control signal by utilizing the PWM dimming signal to generate a new PWM control signal, the dimming signal can be directly carried by the new PWM control signal, so that the structure of the system can be greatly simplified.

The PWM control signal here can be generated by performing an amplitude modulation on the present PWM control signal, or can be generated by performing a frequency modulation on the PWM dimming signal. Further, it can be deemed that the PWM signal in the invention is generated directly according to the PWM dimming signal, i.e., the envelope curve of the high frequency PWM control signal generated is in conformity to the waveform of the PWM dimming signal.

Figure 11:
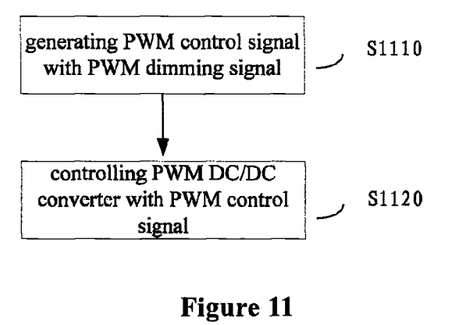
FIG. 11 shows a flow chart of the method for driving LED according to an embodiment.
Figure 12:
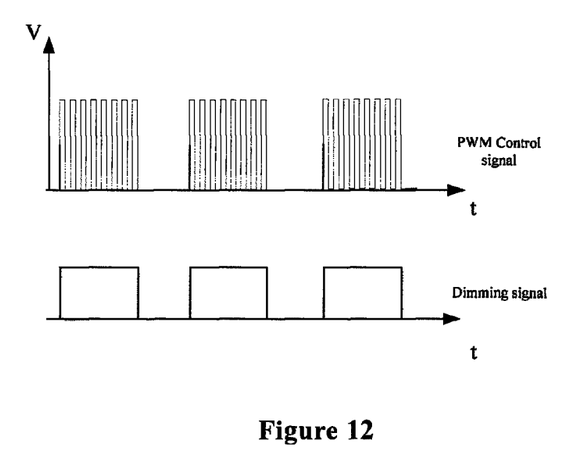
FIG. 12 schematically shows the waveform of the generated PWM control signal.

Thus, according to an embodiment, a method for driving an LED is provided. FIG. 11 shows a flow chart of the method for driving LED. As can be seen from the drawing, the method may include the following:

S1110: generating a PWM control signal with the PWM dimming signal. The frequency of the PWM dimming signal is generally in the range from 100 Hz to 1000 Hz. FIG. 12 schematically shows the generated PWM control signal. As can be seen from the drawing, the envelope curve of the new PWM control signal changes according to the PWM dimming signal. In each non-zero time period of the dimming signal, the original PWM control signal is still included. In other words, an amplitude/frequency modulation is performed on the original PWM control signal with the PWM dimming signal, and the frequency of the PWM control signal is not changed.

S1120: controlling the PWM DC/DC converter with the PWM control signal, so as to generate a driving voltage of the LED.

With the method according to various embodiments, the PWM dimming can be utilized, and meanwhile an effective isolation between the LED device and the high voltage power supply can be ensured.

Sixth Embodiment

Corresponding to the fifth embodiment, according to the sixth embodiment, an LED driving system is provided, which can realize the utilization of the PWM dimming and the effective isolation.

Figure 13:
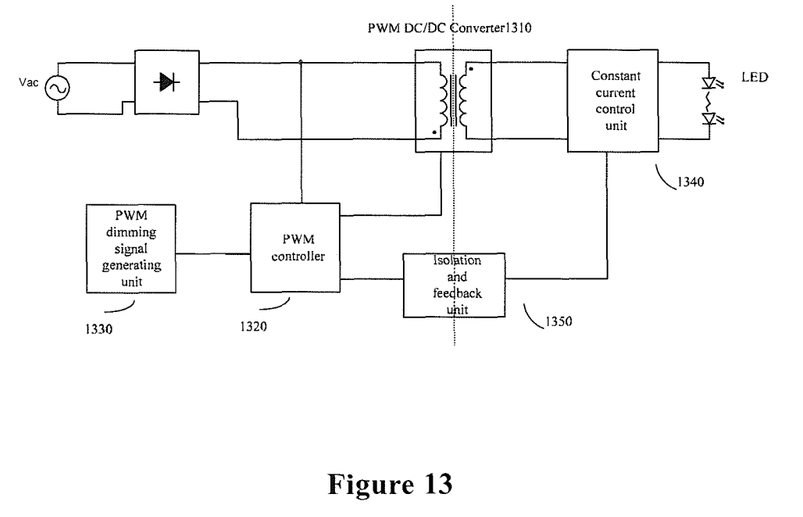
FIG. 13 shows a schematic structural diagram of an LED driving system according to an embodiment.

FIG. 13 shows a schematic structural diagram of the LED driving system according to an embodiment. As can be seen from FIG. 13, the LED driving system may include: a PWM DC/DC converter 1310, a PWM controller 1320 and a PWM dimming signal generator 1330. Wherein the PWM dimming signal generator 1330 is configured to generate the PWM dimming signal. The PWM controller 1320 is configured to generate the PWM control signal by utilizing the PWM dimming signal. Wherein the frequency of the PWM dimming signal is generally in the range from 100 Hz to 1000 Hz. Wherein the PWM DC/DC converter 1310 is configured to generate the driving voltage of LED according to the PWM control signal.

In various embodiments, the LED driving system according to the embodiment may further include a constant current controller 1340, which is adapted to ensure that the magnitude of the current flowing through the LED maintains constant. The operation principle of the constant current controller 1340 is that the current flowing through the LED is detected and compared with a predefined value. When the current of the LED is different from the predefined value, a feedback signal is generated to the PWM controller 1320 for adjusting the PWM control signal. The operation mode is familiar to those skilled in the art, and will not be further illustrated here.

In various embodiments, the LED driving system according to the embodiment may further include an isolation and feedback device 1350, which is configured to input the feedback signal from the constant current control unit 1340 to the PWM controller in an electrical isolation manner. For example, an optical coupling can be employed to achieve the isolation.

With the LED driving system according to various embodiments, the PWM dimming can be utilized, and meanwhile an effective isolation between the LED device and the high voltage power supply can be ensured, so that it is guaranteed that the system can easily be designed in conformity with the security standard. Moreover, the system has a simple structure, so that the production cost is greatly reduced, and a precise constant current character can be ensured. Thus, the high precision requirements regarding the current of LED can be met.

Finally, it should be noted that the term "include", "comprise" or any other variations means a non-exclusive inclusion, so that the process, method, article or device that includes a series of elements includes not only these elements but also other elements that are not explicitly listed, or further includes inherent elements of the process, method, article or device. Moreover, when there is no further limitation, the element defined by the wording "comprise(s) a . . . " does not exclude the case that in the process, method, article or device that includes the element there are other same elements.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for obtaining a conduction angle of a trailing edge dimmer, the method comprising:
   determining a time point t0 when the trailing edge dimmer starts to be conductive;
   determining an earliest time point t1 when a deviation from an ideal waveform appears; and
   determining the conduction angle t1-t0 of the trailing edge dimmer based on the earliest time point t1 when the deviation from the ideal waveform appears and the time point t0 when the trailing edge dimmer starts to be conductive.

2. The method of claim 1,
   wherein the determining an earliest time point when a deviation from an ideal waveform appears comprises:
      performing sampling on an output voltage of the trailing edge dimmer, comparing the sampled values with an ideal waveform, and
      determining the earliest time point t1 when the deviation from the ideal waveform appears based on the difference between the output voltage and the ideal waveform.

3. The method of claim 1,
   wherein in the determining the conduction angle of the trailing edge dimmer, an average value of the conduction angles obtained in a plurality of cycles is calculated, and the average value is taken as an obtained conduction angle.

4. An LED driving method, comprising:
   determining a type of a dimmer;
   obtaining a conduction angle of a leading edge dimmer, when it is determined that the dimmer connected is the leading edge dimmer;
   obtaining a conduction angle of a trailing edge dimmer with a method for obtaining a conduction angle of a trailing edge dimmer, when it is determined that the dimmer connected is the trailing edge dimmer, the method comprising:
      determining a time point t0 when the trailing edge dimmer starts to be conductive;
      determining an earliest time point t1 when a deviation from an ideal waveform appears; and
      determining the conduction angle t1-t0 of the trailing edge dimmer based on the earliest time point t1 when the deviation from the ideal waveform appears and the time point t0 when the trailing edge dimmer starts to be conductive; and
   generating a dimming signal according to the obtained conduction angle of the dimmer.

5. The LED driving method of claim 4, further comprising:
   an anti-jittering control process after the conduction angle of the dimmer is obtained, wherein in the anti-jittering control process, a change in the conduction angle of the dimmer is detected, and only when the change in the conduction angle of the dimmer is larger than a certain threshold value, the dimming signal is generated according to the changed conduction angle of the dimmer.

6. The LED driving method of claim 4, further comprising:
   detecting whether the dimmer is connected, before the determining the type of the dimmer.

7. A conduction angle obtaining device for a trailing edge dimmer, the device comprising:
   a conducting time point determiner, which is configured to determine a time point t0 when the trailing edge dimmer starts to be conductive;
   a phase cutting point determiner, which is configured to determine an earliest time point t1 when a deviation from an ideal waveform appears; and
   a conduction angle determiner, which is configured to determine the conduction angle t1-t0 of the trailing edge dimmer based on the earliest time point t1 when the deviation from the ideal waveform appears and the time point t0 when the trailing edge dimmer starts to be conductive.

8. The conduction angle obtaining device for a trailing edge dimmer of claim 7, wherein the phase cutting point determiner further comprises a sampling device and a comparing device, wherein:
   the sampling device is configured to perform sampling on an output voltage of the trailing edge dimmer to obtain sampled values, and the comparing device is configured to compare the sampled values with an ideal waveform, and determine the earliest time point t1 when the deviation from the ideal waveform appears based on the difference between the output voltage and the ideal waveform.

9. The conduction angle obtaining device for a trailing edge dimmer of claim 7, wherein the conduction angle determiner further comprises an averaging device, which is configured to calculate an average value of the conduction angles obtained in a plurality of cycles, and take the average value as an obtained conduction angle.

10. An LED driving device, comprising:
    a dimmer type determiner, which is configured to determine a type of a dimmer;
    a conduction angle obtaining device for a leading edge dimmer, which is configured to obtain a conduction angle of a leading edge dimmer, when it is determined that the dimmer connected is the leading edge dimmer;
    a conduction angle obtaining device for a trailing edge dimmer, which is configured to obtain a conduction angle of a trailing edge dimmer, when it is determined that the dimmer connected is the trailing edge dimmer, the conduction angle obtaining device comprising:
       a conducting time point determiner, which is configured to determine a time point t0 when the trailing edge dimmer starts to be conductive;
       a phase cutting point determiner, which is configured to determine an earliest time point t1 when a deviation from an ideal waveform appears;
       a conduction angle determiner, which is configured to determine the conduction angle t1-t0 of the trailing edge dimmer based on the earliest time point t1 when the deviation from the ideal waveform appears and the time point t0 when the trailing edge dimmer starts to be conductive; and
    a dimming circuit, which is configured to generate a dimming signal according to the obtained conduction angle of the dimmer.

11. The LED driving device of claim 10, further comprising:
   an anti-jittering controller after the conduction angle obtaining device for the leading edge dimmer and the conduction angle obtaining device for the trailing edge dimmer and before the dimming circuit, wherein the anti-jittering controller is configured to detect a change in the conduction angle of the dimmer, and only when the change in the conduction angle of the dimmer is larger than a certain threshold value, the dimming signal is generated according to the changed conduction angle of the dimmer.

12. The LED driving device of claim 10, further comprising:
   a dimmer detector before the dimmer type determiner, which is configured to detect whether the dimmer is connected.

* * * * *